United States Patent [19]

Cook et al.

[11] Patent Number: 5,465,355

[45] Date of Patent: Nov. 7, 1995

[54] ESTABLISHING AND RESTORING PATHS IN A DATA PROCESSING I/O SYSTEM

[75] Inventors: Thomas E. Cook, Red Hook; Mark J. Fantacone; Robert E. Galbraith, both of Poughkeepsie; Steven G. Glassen, Wallkill; Allan S. Meritt, Poughkeepsie; Kenneth J. Oakes; Harry M. Yudenfriend, both of Wappingers Falls, all of N.Y.

[73] Assignee: International Business Machines Corporation, Armonk, N.Y.

[21] Appl. No.: 150,748

[22] Filed: Nov. 12, 1993

Related U.S. Application Data

[63] Continuation of Ser. No. 754,859, Sep. 4, 1991, abandoned.

[51] Int. Cl.$^6$ .............................. G06F 13/00; G06F 13/14
[52] U.S. Cl. .................. 395/200.15; 395/650; 395/858; 395/284; 395/311; 395/830; 364/238; 364/238.1; 364/238.2; 364/DIG. 1; 370/16
[58] Field of Search ....................................... 395/650, 700

[56] References Cited

U.S. PATENT DOCUMENTS

| | | | |
|---|---|---|---|
| 3,432,813 | 3/1969 | Annunziata et al. | 340/172.5 |
| 3,526,878 | 9/1970 | Bennett et al. | 340/172.5 |
| 3,673,576 | 6/1972 | Donaldson, Jr. | 340/172.5 |
| 3,675,209 | 7/1972 | Trost et al. | 340/172.5 |
| 3,699,530 | 10/1972 | Capowski et al. | 395/275 |
| 3,934,232 | 1/1976 | Curley et al. | 340/172.5 |
| 4,056,843 | 11/1977 | Bishop et al. | 395/325 |
| 4,189,769 | 2/1980 | Cook et al. | 395/275 |
| 4,225,919 | 9/1980 | Kyu et al. | 395/325 |
| 4,261,033 | 4/1981 | Lemay et al. | 395/275 |
| 4,430,710 | 2/1984 | Catiller et al. | 395/200 |
| 4,453,228 | 6/1984 | Loskorn | 395/275 |
| 4,562,533 | 12/1985 | Hodel et al. | 364/200 |
| 4,571,671 | 2/1986 | Burns et al. | 395/250 |
| 4,630,045 | 12/1986 | Georgiou | 340/825.79 |
| 4,635,250 | 1/1987 | Georgiou | 370/58 |
| 4,692,917 | 9/1987 | Fujioka | 370/60 |
| 5,107,489 | 4/1992 | Brown et al. | 370/58.2 |

*Primary Examiner*—Kevin A. Kriess
*Assistant Examiner*—Michael T. Richey
*Attorney, Agent, or Firm*—Floyd A. Gonzalez; James E. Murray

[57] ABSTRACT

A data processing I/O system including a main storage for storing data and data processing instructions arranged in software programs, and a channel subsystem having hardware for reporting conditions in the channel subsystem to the software. A special Channel Subsystem Call (CHSC) instruction is used to store event information from the channel subsystem into the main memory for use by the software such that new or restored resources such as a channel path, a channel path and partial control unit link address, or a channel path and full control unit link address, may be originally made accessible, or may be restored to the I/O system. A mechanism is also provided to inquire of a device how long it expects to not be accessible to give the device sufficient time to reset itself before it is varied offline, thus preventing a device from being isolated or "boxed" prematurely.

17 Claims, 11 Drawing Sheets

FIG.1

| WORD 0 | '0010' | '200E' |
|---|---|---|
| 1 | 00000000 00000000 00000000 00000000 ||
| 2 | 00000000 00000000 00000000 00000000 ||
| 3 | 00000000 00000000 00000000 00000000 ||

| WORD 0 | L2 | | RESPONSE CODE | |
|---|---|---|---|---|
| 1 | 00000000 00000000 00000000 00000000 ||||
| 2 | FLAGS | VF | RS | CC |
| 3 | FLA | | RSID | |
| 4 | 00000000 00000000 00000000 00000000 ||||
| 5 | 00000000 00000000 00000000 00000000 ||||
| 6 // ... n | CONTENT-CODE-DEPENDENT FIELD ||||

ESTABLISHING AND RESTORING PATHS IN A DATA PROCESSING I/O SYSTEM

CROSS REFERENCE TO RELATED APPLICATION

This application is a continuation of application Ser. No. 07/754,859, filed Sep. 4, 1991, now abandoned.

BACKGROUND OF THE INVENTION

This invention relates to the configuration of a data processing input/output (I/O) system, and more particularly relates to defining the accessibility of paths in the data processing I/O system.

In the prior art, a peripheral device or device path may be precluded from being accessible during system initialization for the following reasons:

Not enough resources at the control unit to accommodate the system (i.e. logical paths);

link failure;

internal control unit failure;

dynamic switch failure; or human error.

Additionally, during the normal operation of the data processing system, I/O resources may become temporarily unaccessible due to one of the following conditions:

link failure;

internal control unit failure;

dynamic switch failure; or human error such as the disconnection of a cable resulting in a link failure.

When the operating system tries to access a device over a path in the failure state, a not operational condition is recognized by the software and the path is marked logically offline wherein the path is no longer eligible to start I/O requests. If all paths to a device are marked offline while the system is initializing, then the device is marked offline. If all the paths to a device are marked offline while the system is running, the device is forced offline and all I/O attempts to the device are rejected with a permanent error.

If the I/O resource becomes available, no indication is given to the operating system. Thus the system operator must manually issue operator commands to put the resources back into use.

In the prior art, when a peripheral device in an I/O system became unaccessible to the I/O system it was only necessary to set a latch indicating that the device was busy. Before an I/O operation, the I/O system interrogated the latch to see if the device was accessible. As soon as the device became accessible, the latch is reset to remove the busy condition, wherein the resetting of the latch allowed the I/O operation to proceed. However, in an I/O system in which a channel is connected to a peripheral device by a serial link, especially through a switch, status of the device must be sent to the channel by means of an exchange of data frames instead of the setting of a latch. In the event that a resource such as a link between the peripheral device and the channel is broken, such as by accidentally unplugging the link, an exchange cannot take place until the link is repaired or replaced. In these situations, the peripheral device is typically isolated or "boxed" from the channel so that future I/O operations between the channel and the device are not attempted until the boxed device is manually made accessible to the I/O system by a "vary on line" process that restores the link accessibility.

SUMMARY OF THE INVENTION

In the present invention, the I/O system includes a main storage for storing data and data processing instructions arranged in software programs, and a channel subsystem having hardware for reporting conditions in the channel subsystem to the software. A special Channel Subsystem Call (CHSC) instruction is used to store event information from the channel subsystem into the main memory for use by the software such that new or restored resources such as a channel path, a channel path and partial control unit link address, or a channel path and full control unit link address, may be originally made accessible, or may be restored to the I/O system. A mechanism is also provided to inquire of a device how long it expects to not be accessible to give the device sufficient time to reset itself before it is varied offline, thus preventing a device from being isolated or "boxed" prematurely.

It is thus an object of the present invention to report I/O resource accessibility from a channel subsystem to software in a data processing I/O system.

It is another object of the present invention to provide a mechanism for establishing and restoring a resource in a data processing I/O system.

It is another object of the present invention to provide a mechanism to inquire of a device how long it expects to be not accessible to give the device sufficient time to reset itself before it is varied offline, thus preventing a device from being boxed prematurely.

These and other objects of the present invention will be apparent from the following more particular description of the preferred embodiment of the invention as illustrated in the drawings.

BRIEF DESCRIPTION OF THE DRAWINGS

FIG. 4 is a flowchart that shows the logic used by the operating system during initialization in order to know which devices belong to which control units, and which channel paths the control units belong to;

DESCRIPTION OF THE PREFERRED EMBODIMENT

Figure 1:
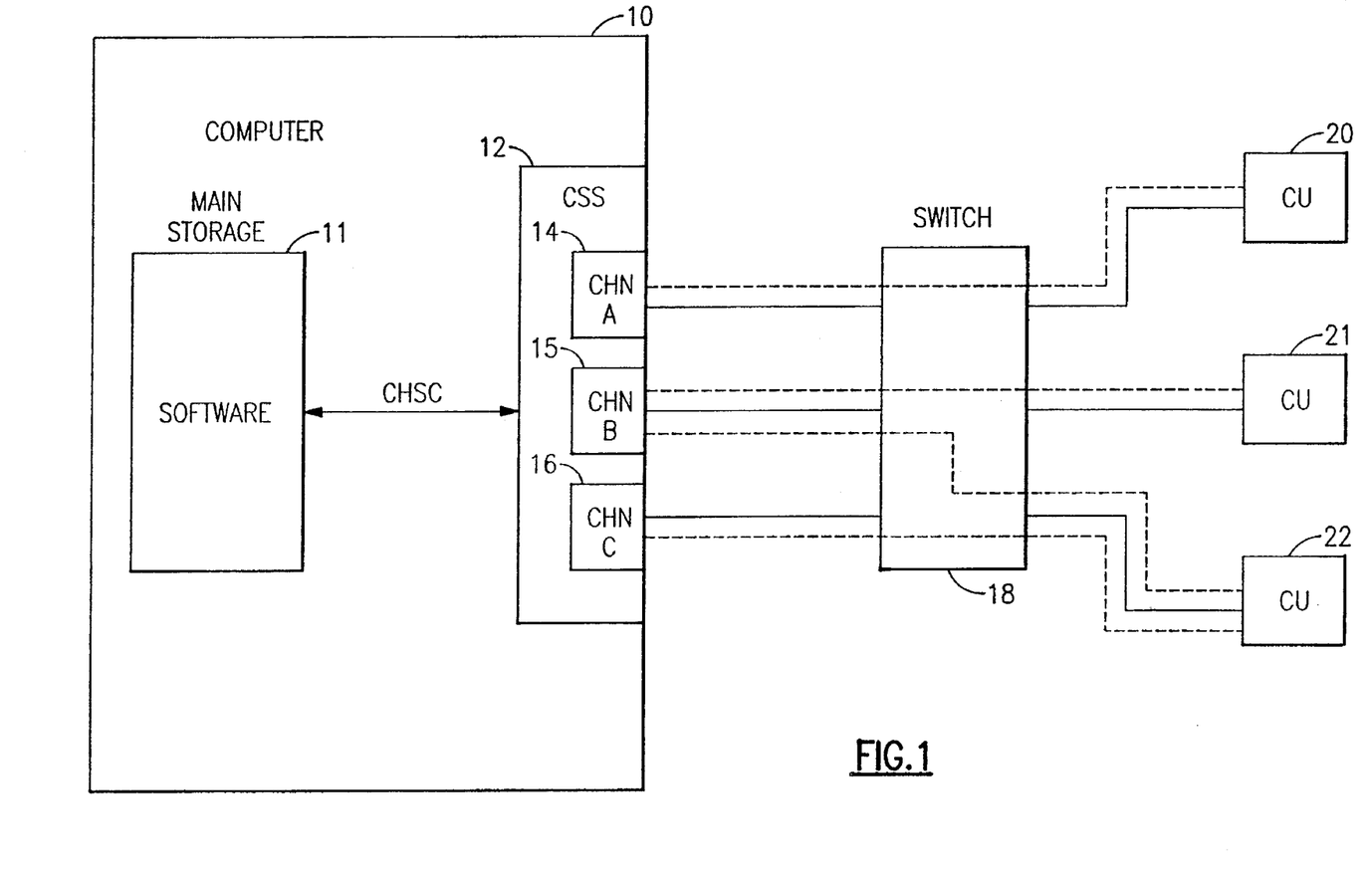
FIG. 1 is a block diagram showing a data processing I/O system of the present invention having a computer with a main storage and a channel subsystem.

FIG. 1 is a block diagram showing a data processing I/O system of the present invention, wherein the data processing system includes a computer 10 having a main storage 11 and a channel subsystem (CSS) 12. The main storage 11 contains data and data instructions arranged in software programs, including an operating system, for the processing of data. The operating system and I/O programs in main storage 11 are referred to herein as the operating system, or the program, or software.

The mentioned CSS 12 has multiple channels, such as channels 14, 15 and 16 designated herein as channels A, B and C, respectively. As is well known in the art, I/O programs are set up in the main storage 11 and then executed by the CSS by means of channel control words (CCWs) for conducting I/O operations. Additional communications between the software and the CSS are provided by issuing Channel Subsystem Call (CHSC) commands. One of the CHSC commands is the store-event-information command as discussed in connection with FIGS. 2 and 3.

In the embodiment of FIG. 1, each of the channels A, B and C are connected to ports of a dynamic switch 18, which has other ports connected to control units 20, 21 and 22. The dynamic switch 18 may be as described in U.S.Pat. No. 5,107,489 issued Apr. 21, 1992 for Switch and its Protocol for Making Dynamic Connections, and assigned to the assignee of the present invention. Each channel 14–16 has a channel path which is identified by a channel path identification (CHPID). Each CHPID represents the path from a channel to a connected control unit. A link is a point-to-point transmission medium, such as a pair of conductors (optical fibers) that physically interconnects, in the embodiment of FIG. 1, a control unit and a channel, a channel and the dynamic switch, or a control unit and the dynamic switch. Each link is identified by a link address. It will thus be understood that a CHPID may have more than one link, such as a first link from a channel to one port of the dynamic switch, and a second link from a connected port of the dynamic switch to a control unit. A logical path is the relationship that exists between a channel and a control unit for device-level communication during execution of an I/O operation and presentation of status. The establishment of logical paths is disclosed in U.S. patent application Ser. No. 07/576,561 filed Aug. 31, 1990 for Logical Channel Paths in a Computer I/O System, assigned to the assignee of the present invention and incorporated herein by reference.

In the embodiment of FIG. 1, there is a channel path between channel A and control unit 20, a channel path between channel B and control units 21, a channel path between channel B and control unit 22, and a channel path between channel C and control unit 22. The dotted lines between the channels and the control units represent logical paths. There is a logical path between channel A and control unit 20, a logical path between channel B and control unit 21, a logical path between channel B and control unit 22, and a logical path between channel C and the control unit 22.

There are several events which could indicate that a resource which was previously unaccessible is now accessible. The most common of these events is the successful establishment of a logical path. Another less common event is the successful completion of a device level system reset. Other events may also be possible. Following is a discussion of the successful establishment of a logical path as an example of an event which indicates resources that have become accessible.

The store-event-information command is used to store event information that has been made pending by the channel subsystem 12. Normally, this command is executed as a result of the program having received an event-information-pending channel report, the event-information-pending channel report being well known in the art.

The execution of the store-event-information command may change information contained in the channel subsystem.

Figure 2:
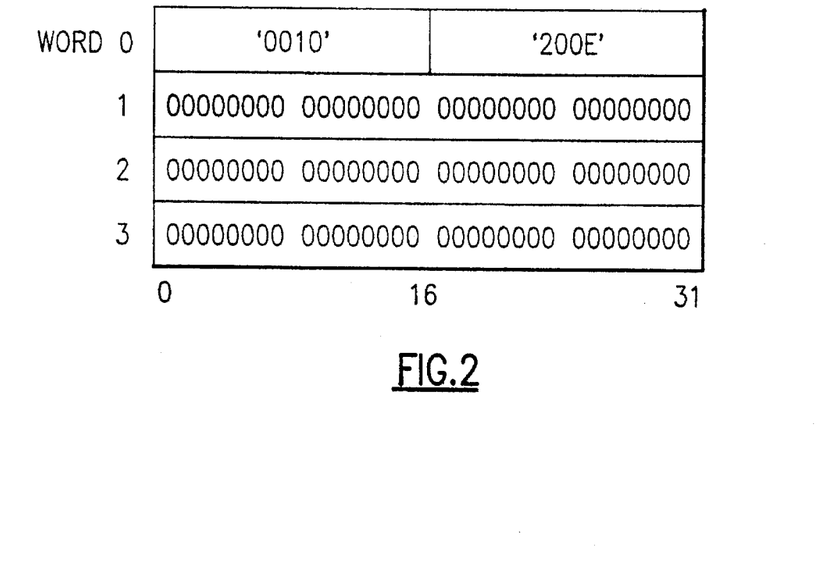
FIG. 2 shows the format of the command-request block of a store-event-information command for reporting events in the channel subsystem to an operating system in the main storage of FIG. 1.

The command-request block for the store-event-information command has the format shown in FIG. 2, wherein:

L1: Bytes 0–1 of word 0 contain the value 0010 hex, specifying a command-request-block length of 16 bytes.

Command Code: Bytes 2–3 of word 0 contain the value 200E hex, specifying the store-event-information command.

Reserved: Words 1–3 are reserved and contain zeros.

Figure 3:
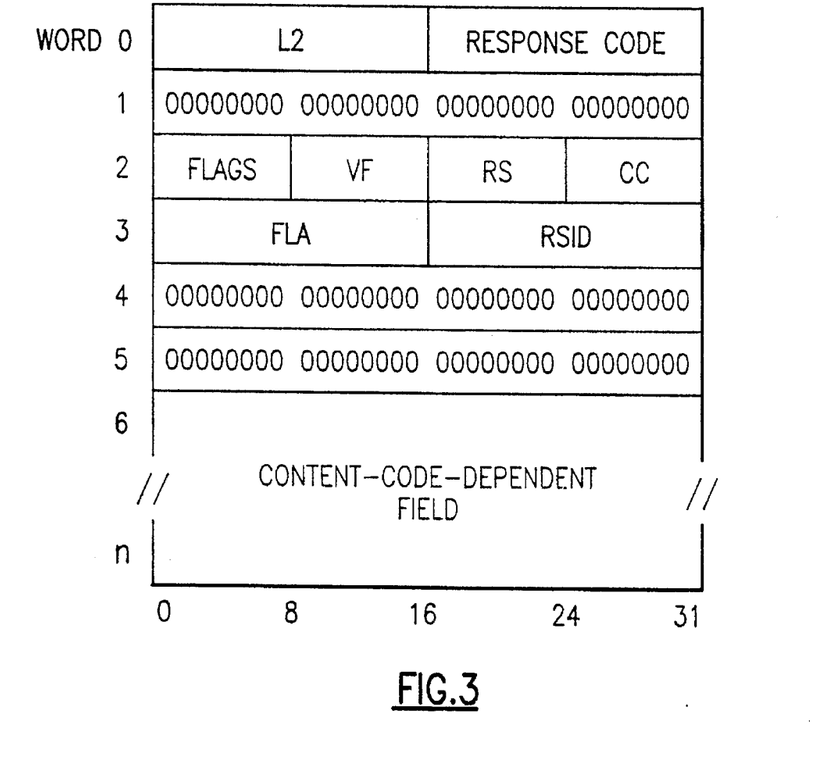
FIG. 3 shows the format of the response block of the store-event-information command of FIG. 2.

The command-response block for the store-event-information command has the format shown in FIG. 3, wherein:

L2: Bytes 0–1 of word 0 specify the length in bytes of the command-response block. The length depends on the response code that is stored as a result of the attempt to execute the store-event-information command.

If a response code other than 0001 hex is stored in the response-code field (bytes 2–3 of word 0), no information is stored in the response-data area, and L2 specifies a length of eight bytes for the command-response block.

If a response code of 0001 hex is stored in the response-code field (bytes 2–3 of word 0), event information is stored in the response-data area, and L2 specifies a command-response-block length of 24 bytes plus a value which is dependent on the contents of the content-code (CC) field.

Response Code: Bytes 2–3 of word 0 contain a 16-bit unsigned binary integer that describes the results of the attempt to execute the store-event-information command. The valid response codes are 0001, 0003, and 0005 hex (see "Special Conditions").

For the store-event-information command, the response-data area contains a fixed-length portion and a variable-length portion. The format of words 2–5 is the same for all types of event information and the format of words 6–n is specified by the content-code field.

Reserved: Word 1 and words 4–5 are reserved and contain zeros.

Flags: Byte 0 of word 2 specifies conditions that exist in the channel subsystem. The meaning of bits 0–7 is as follows:

| Bits | Meaning |
| --- | --- |
| 0 | When one, bit 0 specifies that the channel subsystem has pending event information in addition to the information provided in response to this CHSC command. The program can obtain the additional information by executing the store-event-information command again. When zero, bit 0 specifies that the channel subsystem has no additional pending event information. |

-continued

| Bits | Meaning |
|------|---------|
| 1 | When one, bit 1 specifies that the channel subsystem has recognized an overflow condition and event information has been lost. The overflow condition occurred while the event information now contained in the response-data area was the most recently pending information when the overflow condition was recognized. The overflow does not affect the information contained in the response-data area. When zero, bit 1 specifies the channel subsystem has not recognized an overflow condition. |
| 2–7 | Reserved. |

Validity Flags (VF): Byte 1 of word 2 indicates the validity, of the information stored in specified fields of the response-data area. The meaning of bits 0–7 is as follows:

| Bits | Meaning |
|------|---------|
| 0 | When bit 0 is one, the FLA field contains valid information. When bit 0 is zero, the contents of the FLA field have no meaning. |
| 1 | When bit 1 is one and bit 0 is one, the FLA field contains a full link address (FLA). When bit 1 is zero and bit 0 is one, byte 0 of the FLA field contains a link address, and byte 1 of the FLA field has no meaning. |
| 2–7 | Reserved. |

Reporting Source (RS): Byte 2 of word 2 contains an eight-bit unsigned binary integer that specifies the type of information, if any, that is contained in the reporting-source-ID (RSID) field. The values that can be specified and their meanings are as follows:

| Values | Meaning |
|--------|---------|
| 0 | The RSID field does not contain valid information. |
| 1–2 | Reserved. |
| 3 | Subchannel Number: The RSID field contains a two-byte subchannel number. |
| 4 | CHPID: The RSID field contains a channel-path ID. Byte 0 of the RSID field contains zeros, and byte 1 of the RSID field contains a channel-path ID. |
| 3–255 | Reserved. |

Content Code (CC): Byte 3 of word 2 contains an eight-bit unsigned binary integer that describes the type of information that is contained in the response-data area. The values that can be specified and their meanings are as follows:

| Values | Meaning |
|--------|---------|
| 0 | Reserved. |
| 1 | Link-Incident Information: A link incident has been recognized for an attachable-unit interface. In addition to the information contained in words 2–5 of the response-data area, the content-code-dependent field contains 104 bytes of information describing the incident. |
| 2 | I/O-Resource-Accessibility Information: One or more I/O resources previously not accessible may have become accessible. |
| 3–255 | Reserved. |

Full Link Address (FLA): Bytes 0–1 of word 3 may, depending on the event, contain a link address or a full link address (FLA). The validity of the contents of the FLA field is specified by the contents of the VF field.

Reporting-Source ID (RSID): Bytes 2–3 of word 3 contain the reporting-source ID which may, depending on the event, identify a channel-subsystem facility. The contents of the RSID field are specified by the contents of the RS field.

Content-Code-Dependent Field: Words 6–n may contain additional information about the event. If a response code of 0001 hex is stored in the response-code field, the number of bytes of additional information, if any, can be determined by subtracting 24 bytes from the size of the command-response block.

I/O-Resource-Accessibility Information

When the response code is 0001 hex and the content code is 2, the response-data area contains I/O-resource-accessibility information. I/O-resource-accessibility information indicates to the program that one or more events have occurred at the channel subsystem, channel path, or I/O device that may allow communication with one or more I/O devices that previously were not accessible.

The RS, RSID, FLA and VF fields are used to identify the set of I/O devices that may have become accessible.

The RS field contains the value 4, indicating that the RSID contains the CHPID.

When bits 0–1 of the VF field are both zero, one or more of the I/O devices that are attached to the specified channel path (determined by the specified CHPID) may now be accessible.

When bits 0–1 of the VF field are one and zero, one or more of the I/O devices that are attached to the specified link (determined by the specified CHPID and link address) may now be accessible.

When bits 0–1 of the VF field are both one, one or more of the I/O devices that are attached to the specified control-unit image (determined by the specified CHPID and FLA) may now be accessible.

Special Conditions

A special condition exists if a response code other than 0001 hex is stored in the command-response block indicating that the execution of the command is suppressed. The special conditions for the store-event-information command are as follows:

0003: Response code 0003 hex is stored if the L1 field contains a value other than 0010 hex or if words 1–3 are not all zeros.

0005: Response code 0005 hex is stored if the channel subsystem has no event information.

Figure 4:
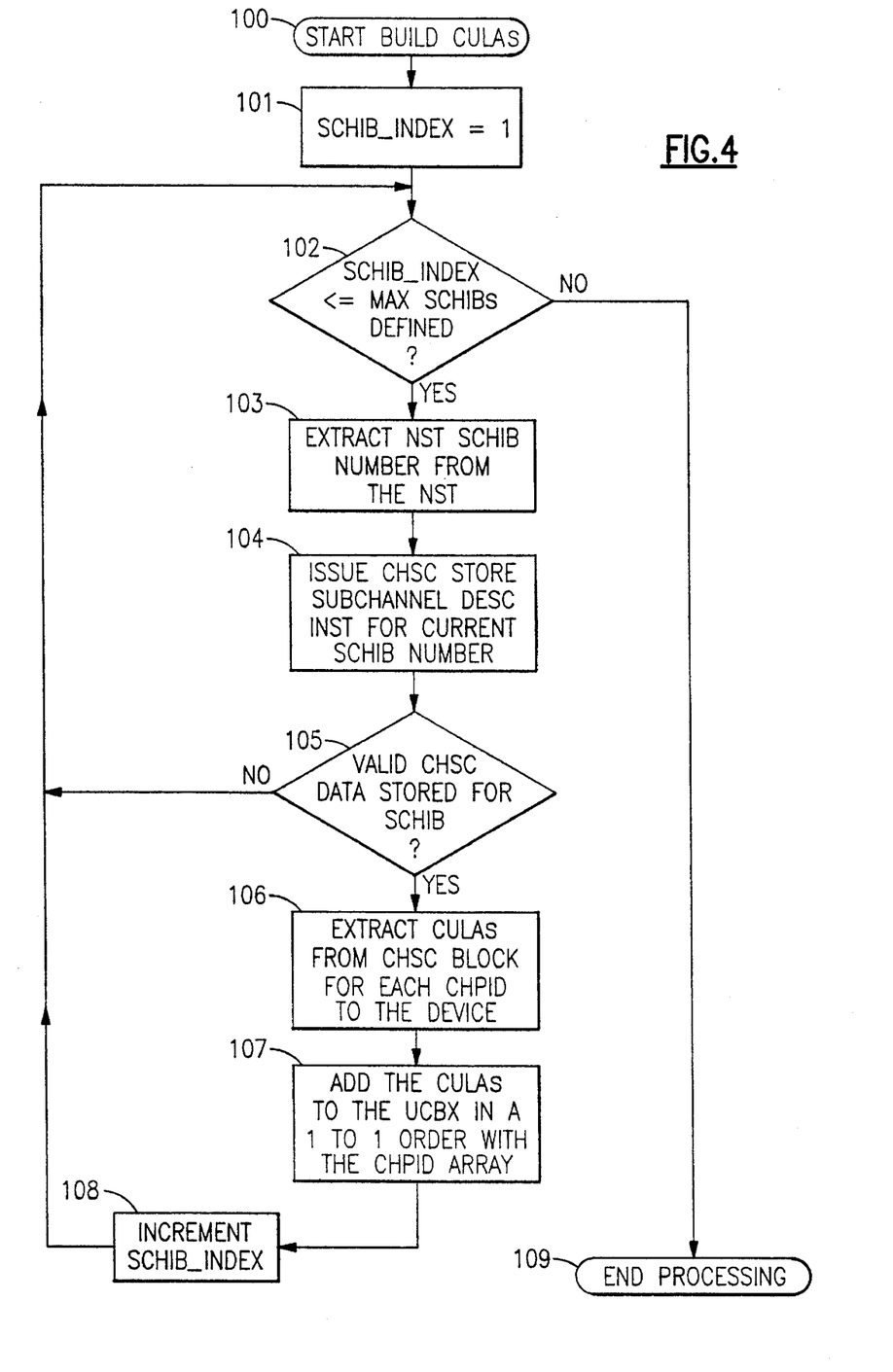

FIG. 4 is a flow diagram that shows the logic that the operating system uses during initialization in order to understand which devices belong to which destination link address, and which CHPID the destination link address belongs to. It will be understood that the destination link address may represent a control unit or a logical control unit. This information is used later when an incident report, to be described, occurs in order to determine which devices belong to the report. Block 100 is a description or title block which identifies the routine of FIG. 4 as a routine for issuing store-subchannel-description CHSC commands for a set of subchannel information blocks (SCHIBs). The SCHIBs are well understood in the art and identify the CHPIDs in the CSS. In response to these CHSC commands, the CSS returns information which includes data that identifies the set of control units that belong to each CHPID.

As mentioned, the store-subchannel-description CHSC command is used to obtain the link addresses that are assigned to the control-unit link-level facilities associated with a specified range of subchannels.

The execution of the store-subchannel-description command does not change any information contained in the channel subsystem.

The command-request block for store subchannel description contains the following:

L1: Bytes 0–1 contain the value 0010 hex, specifying a command-request-block length of 16 bytes.

Command Code: Bytes 2–3 of word 0 contain the value 0004 hex, specifying the store-subchannel-description command.

Reserved: Bits 0–15 of words 1–2, and word 3 must be zeros.

First Subchannel Number: Bytes 2–3 of word 1 specify the subchannel number identifying the first subchannel for which information is requested.

Last Subchannel Number: Bytes 2–3 of word 2 specify the subchannel number identifying the last subchannel for which information is requested. The value in bytes 2–3 of word 2 is equal to or greater than the value specified in bytes 2–3 of word 1.

The command-response block for the store-subchannel-description command contains the following:

L2: Bytes 0–1 of word 0 specify the length in bytes of the command-response block. The length depends on the response code that is stored as a result of the attempt to execute the store-subchannel-description command.

If a response code other than 0001 hex is stored in the response-code field (bytes 2–3 of word 0), no subchannel-description blocks are stored as a result of the attempt to execute the command, and L2 specifies a length of eight bytes for the command-response block.

If a response code of 0001 hex is stored in the response-code field (bytes 2–3 of word 0), at least one subchannel-description block is stored in the command-response block as a result of the attempt to execute the command, and L2 specifies a command-response-block length of eight bytes plus 32 bytes for each of the subchannel-description blocks that are stored.

Response Code: Bytes 2–3 of word 0 contain a 16-bit unsigned binary integer that describes the results of the attempt to execute the store-subchannel-description command. The valid response codes are 0001, 0003, and 0004 hex.

Reserved: Word 1 is zero.

Words 2–n: When response code 0001 hex is stored, up to 127 32-byte subchannel-description blocks are stored in the response-data area of the command-response block. The number of subchannel-description blocks stored depends on: the number of subchannels in the range specified in the command-request block, conditions in the channel subsystem when CHSC is executed, and the channel-subsystem model. At least one subchannel-description block is stored, and the actual number of blocks stored is determined by subtracting eight bytes from the size of the command-response block and dividing the remainder by 32.

Subchannel-description blocks are stored for some or all of the specified subchannels, beginning with the subchannel specified by the first-subchannel-number field. The Subchannel-description blocks are stored sequentially in ascending order.

The subchannel-description block contains the following:

Device Number: Bits 16–31 of word 0 contain the binary representation of the hexadecimal four-digit device number of the device that is associated with the specified subchannel. The device number is a system-unique parameter that is assigned to the device when it is defined to the channel subsystem.

Path Mask (PM): Bits 0-7 of word 1 indicate the validity of the CHPIDs (see below) for those channel paths defined for the I/O device associated with the specified subchannel. Each bit of the PM field corresponds one-for-one, by relative bit position, with a CHPID located in an associated byte of words 2 and 3. A PM bit stored as one indicates that the corresponding CHPID field is valid. A PM bit stored as zero indicates that the corresponding CHPID field is not valid.

FLA Validity Mask (FLAVM): Bits 8–15 of word 1 indicate the validity of the full-link-address fields (see below). Each bit of the FLAVM corresponds one-for-one, by relative position, with a full-link-address field located in words 4–7. A FLAVM bit stored as one indicates that the corresponding full-link-address field is valid. A FLAVM bit stored as zero indicates that the corresponding full-link-address field is not valid.

Subchannel Number: Bytes 2–3 of word 1 specify the subchannel to which the information in this subchannel-description block applies.

Channel-Path Identifiers (CHPIDs): Words 2 and 3 contain eight one-byte CHPIDs corresponding to bits 0–7 of the PM field. A CHPID is valid if the corresponding PM bit is one. Each valid CHPID contains the identifier of a physical channel path to the associated I/O device. The set of valid CHPIDs always reflects the full complement of channel paths defined for the associated I/O device, regardless of whether those channel paths are currently available.

Full Link Address (FLA): Words 4–7 contain up to eight two-byte full link addresses that are used to access the I/O device associated with the specified subchannel. Each two-byte field corresponds, one-for-one, with the CHPID field that is in the same relative position.

A full link address is the information that is contained in the destination-address field of frames that are received by control units that provide access to the I/O device associated with the specified subchannel and in the source-address field of frames that are sent by those control units.

Special Conditions

A special condition exists if a response code other than 0001 hex is stored in the command-response block indicating that the execution of the command is suppressed. The special conditions for the store-subchannel-description command are as follows:

'0003': Response code 0003 hex is stored if the L1 field contains a value other than 0010 hex, if bits 0–15 of words 1–2, and word 3 are not zeros, or if the last-subchannel-number field is less than the first-subchannel-number field.

'0004': Response code 0004 hex is stored if the command is not installed on the model.

At 101, the SCHIB index is set to one. At 102, a check is made to determine if the index is less than or equal to the maximum. This provides a loop for looping through all of the SCHIBs. If the check at 102 is yes, the operating system goes to 103 wherein the first subchannel number is extracted from the NIP SCHIB table (NST). The NST is built to contain a copy of each subchannel for the system image. At 104, the store-subchannel-description CHSC command is issued for the subchannel number extracted at 103 from the current SCHIB. A check is made at 105 to determine if the CHSC data returned as a result of the command issued at 104 is valid. If not, the operating system loops back to 102.

If the data is valid at 105, the operating system goes to 106 to extract the control unit link address (CULA) from the response block of the CHSC command for each CHPID to each device in the response block. This extracted CULA is stored in unit control block extensions (UCBX) for unit control blocks (UCBs) which were previously built by the operating system to represent, in software, devices in the I/O system, as well understood in the art.

At 108, the SCHIB index is incremented by one, and the operating system loops to 102 to continue with the next SCHIB.

If the index is not less than or equal to the maximum at 102, the operating system goes to 109 to end this routine. As a result of this routine, all of the CULAs for all of the devices will be known for all of the CHPIDs in the CSS. Thus, for every incident report that comes back, the operating system can find the devices that correspond to that incident report, as will be described.

Figure 5:
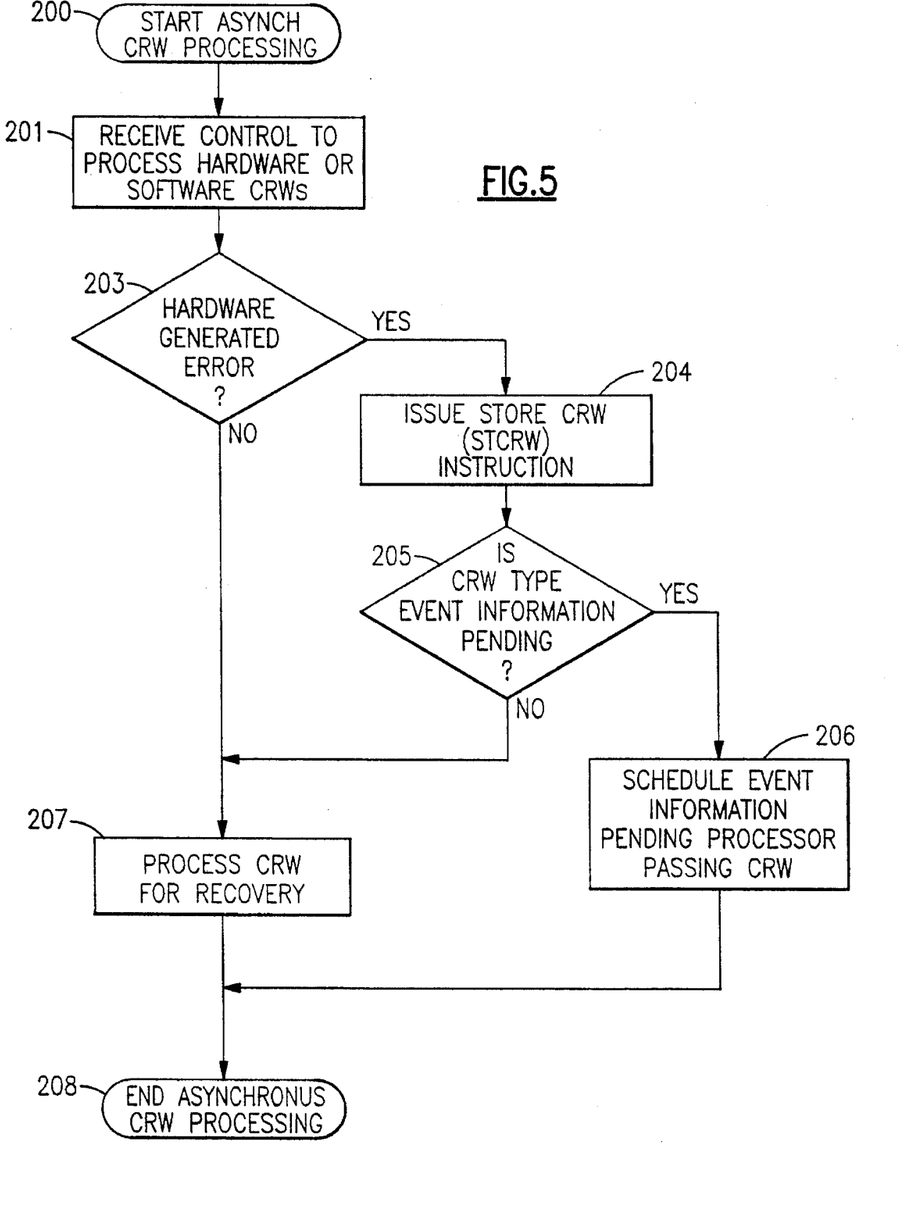
FIG. 5 is a flowchart showing a procedure for the asynchronous processing of a channel report word.

FIG. 5 is a flowchart showing the logic of a procedure for the asynchronous processing of a channel report word. At 200, the procedure of FIG. 5 starts to asynchronously process a channel report word (CRW). As indicated by label 201, the procedure receives control to process hardware or software CRWs. This routine is invoked when an interrupt is received indicating that a CRW is to be processed. At 203, a check is made to determine if the interrupt is from a hardware generated error from the hardware of the CSS. If yes, the operating system goes to 204 to issue a store CRW instruction in order to retrieve information that indicates what kind of error report is pending. A check is made at 205 to determine if the CRW type thus stored indicates that an event information report is pending. If yes, a unit of work is scheduled at 206 to retrieve the channel information pending. After the unit of work is scheduled at 206, asynchronous CRW processing is ended at 208. If the results at 203 or 205 is no, error recovery is performed at 207. The recovery process at 207 is not part of the present invention, and will not be discussed further.

Figure 6:
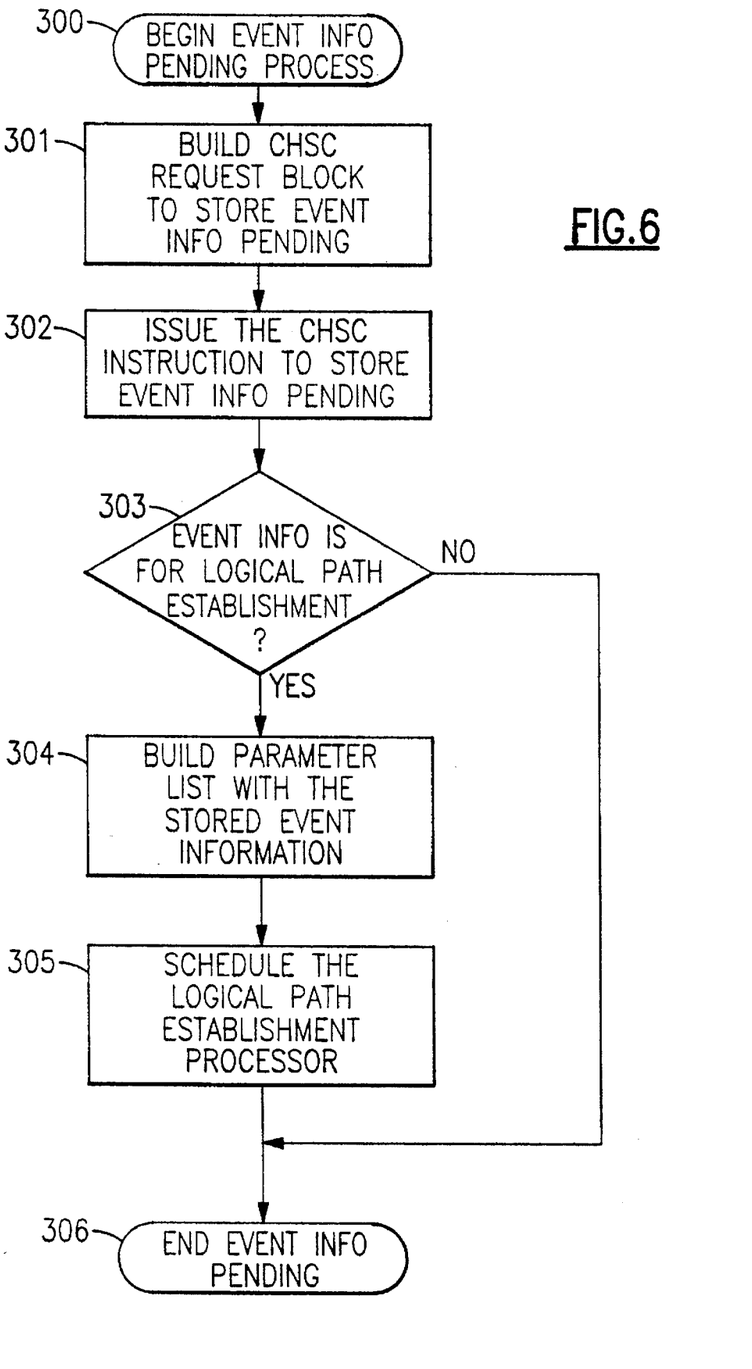
FIG. 6 is a flowchart of the asynchronous processing to retrieve pending event information that was scheduled in the procedure of FIG. 5.

FIG. 6 is a flowchart of the asynchronous processing to retrieve the pending event information that was scheduled at 206 of FIG. 5. At 300, the operating system receives a control to begin the event information pending process. At 301, the request block is built for the store event information pending command. At 302, the store-event-information CHSC command is issued to retrieve the pending event information. The request block for the store-event-information command is discussed in connection with FIG. 2, and the response block for the store-event-information command is discussed in connection with FIG. 3. At 303, a check is made to identify if the event information is for logical path establishment which indicates if the report contains I/O-resource-accessibility information, as previously discussed. If yes, a parameter list is built with the stored event information at 304. The operating system then goes to 305 to schedule a unit of work to process the report. This process will be described in connection with FIG. 7. After the unit of work is scheduled at 305, the process ends at 306. If the check at 303 is no, the process goes to end 306.

Figures 7, 7A:
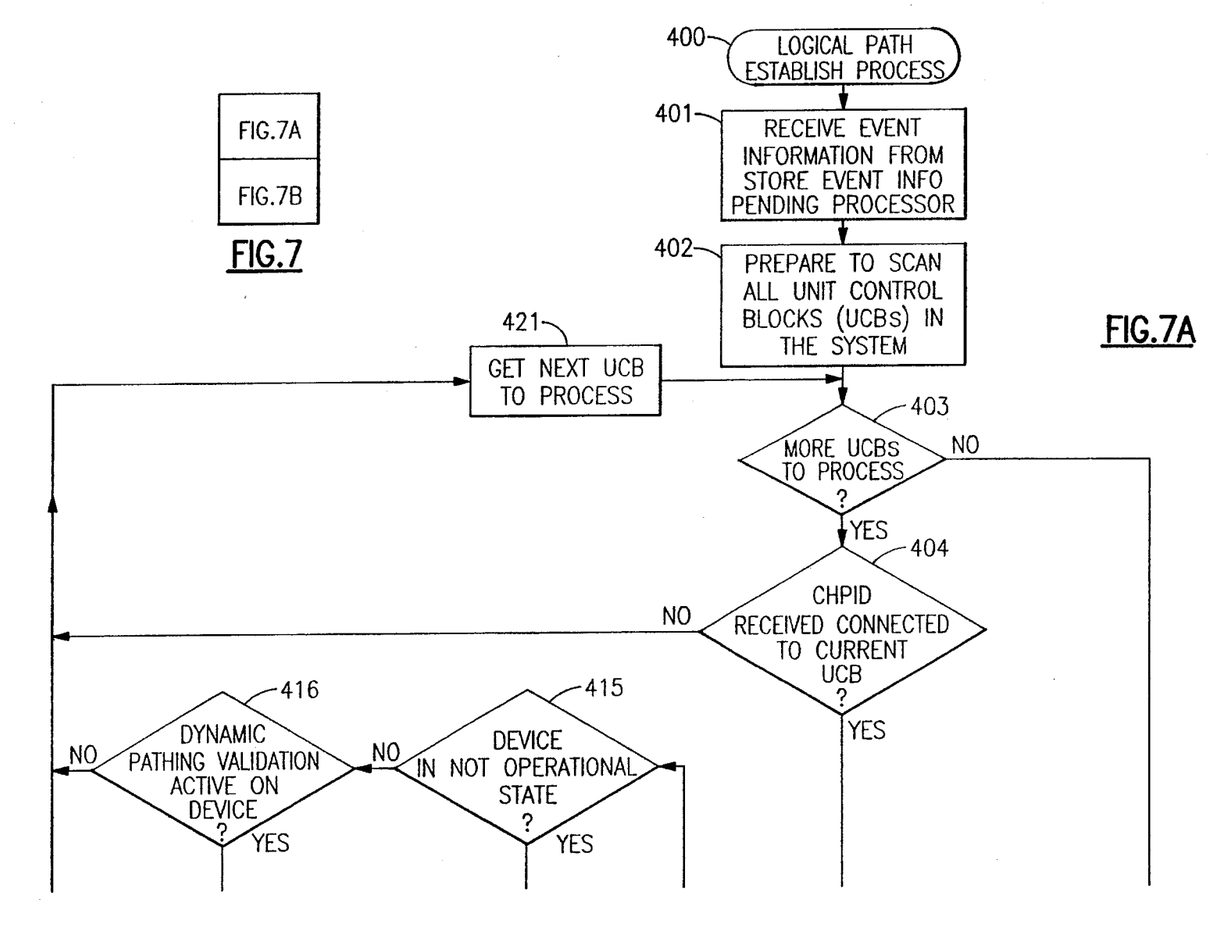
FIG. 7 is a flowchart of the recovery process of an I/O-resource-accessibility report reporting the establishment of a logical path.
Figure 7B:
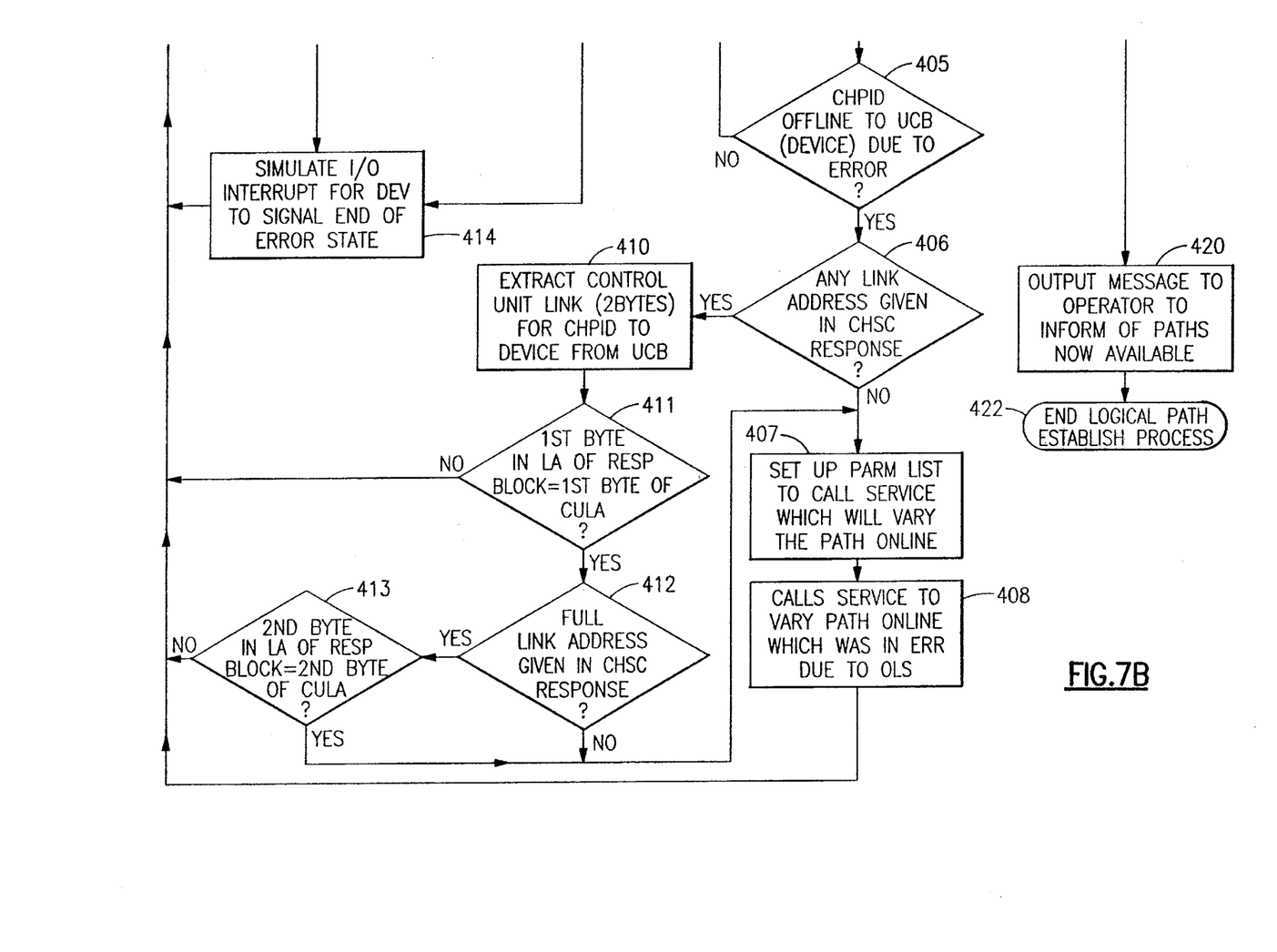

FIG. 7 is a flowchart of the recovery process for the I/O-resource-accessibility report wherein a logical path is established. The recovery process is started at 400. At 401, the event information report scheduled at 305 is received. At 403, the operating system prepares to scan all of the UCBs in the system completed in the routine of FIG. 4.

At 403, a check is made to determine if there are more UCBs to process. If yes, the operating system goes to 404 where a check is made to determine if a CHPID was received at 401 which is connected to the current UCB. If yes at 404, the operating system checks at 405 it determine if the CHPID is offline to the UCB due to an error. If yes at 405, the operating system checks at 406 to determine if any link address is given in the CHSC response received at 401. If no at 406, the operating system goes to 407. It will be understood that at this time, the operating system has identified an established path which is to be varied online. At 407, a parameter list is set up to call a service which will vary the path online. At 408, the service is called to vary the identified path online. The operating system then goes to 421 to get the next UCB to process, and returns to the check at 403.

Returning to 404, if the CHPID received at 401 is connected to the current UCB, the operating system goes to 421 to continue processing the UCBs.

If the check at 405 is no, the operating system goes to 415 to check if the device represented by the current UCB is in a not operational state. If no, a check is made at 416 to check if dynamic pathing validation is active on the device. If no at 416, the operating system goes to 421 to continue processing the UCBs.

If the checks at either 415 or 416 are yes, the operating system goes to 414 to simulate an I/O interrupt for the device to signal an end of an error state. The interaction of this I/O interrupt and a device in an error state will be discussed in connection with FIGS. 8 and 9.

Returning to 406, if there is a link address in the response, a check is made at 410 to extract the control unit link address for the CHPID to the device from the UCB. A comparison is made to compare the first byte of the link address from the response block received at 401 with the first byte of the control unit link address from the UCB. If they do not match at 411, the operating system goes to 421 to continue processing the UCBs. If there is a match at 411, a check is made at 412 to determine if a full link address is given in the CHSC response. If yes at 412, a check is made at 413 to determine if the second byte of the link address of the response block received at 401 matches the second byte of the control unit link address of the UCB. If no at 413, the operating system goes to 421 to continue processing the UCBs. If the check at 412 is no or the check at 413 is yes, the operating system goes to 407 and 408 to vary the path identified by the link address online.

Returning to 403, if all of the UCBs have been processed, a message is output to inform the operator that paths varied online by this process are available, and the process is ended at 422.

Figure 8:
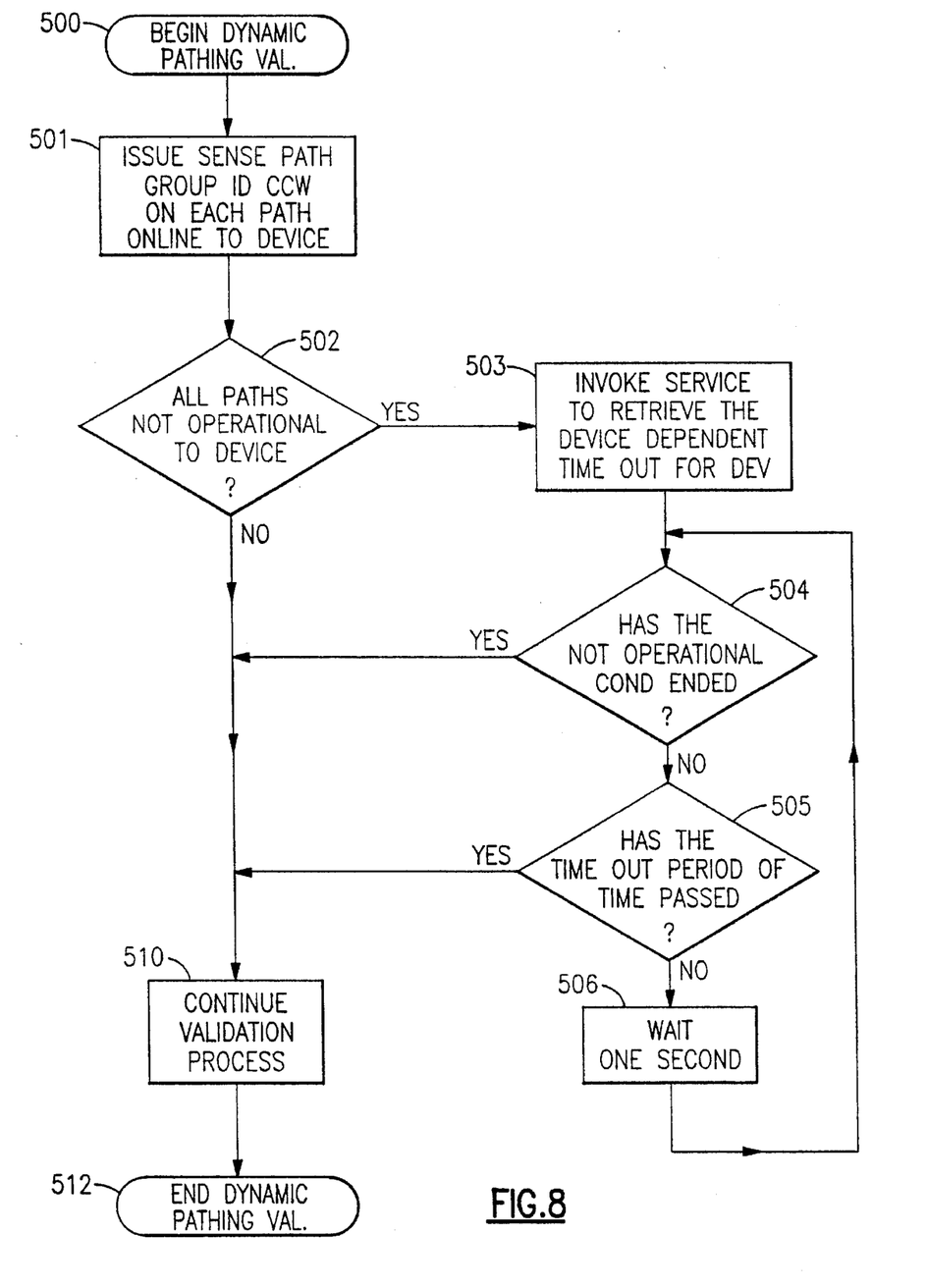
FIG. 8 is a flowchart showing a dynamic pathing validation procedure.

FIG. 8 is a flowchart showing a dynamic pathing validation procedure when the last path to a device becomes not operational. This routine is invoked to prevent a device from being prematurely boxed without giving the routine of FIG. 7 a chance to restore the path to the device. The process starts at 500 when, for instance, a not operational condition is found on a device, when a failure interrupt condition is received, or following a channel path recovery. At 501, a sense group ID CCW command is issued to each path which is online to a device. If at 502, it is determined that no paths to a device are operational, a service is invoked at 503 to retrieve from the device self description data, a device dependent time, to be explained in connection with FIG. 9. At 504, a check is made to determine if the not operational condition has ended. The not operational condition checked for at 504 is ended as a result of 414 in FIG. 7. If no at 504, a check is made at 505 to determine if the time out period for the device has passed. If no at 505, the operating system waits at 506 for one second, and then goes to 504. It will be understood that the process of FIG. 7 is occurring while the waiting of 506 occurs. If the check at 502 is no or the check at either 504 or 505 is yes, the operating system goes to 510 to continue the validation system. When the paths to all of the devices have been thus validated, the process ends at 512.

Figure 9:
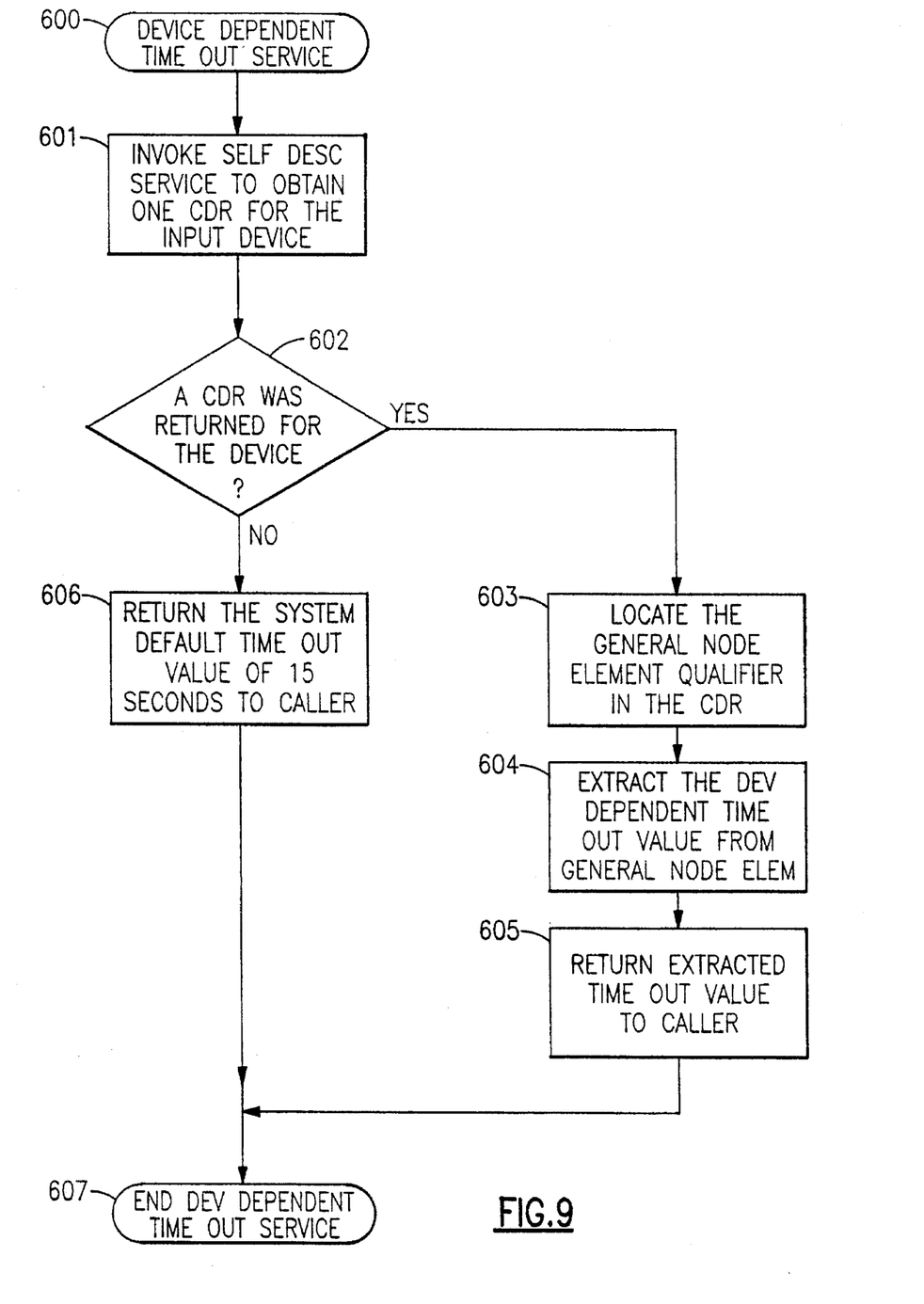
FIG. 9 is a flowchart showing the retrieving of time out data from the self description of a device.

FIG. 9 is a flowchart showing the retrieving of time out data for 503 of FIG. 8. The process is started at 600 to invoke self description service to obtain one CDR for the input device, as shown in title block 601. Self description data is kept for each device in a Configuration Data Record (CDR) which includes the time out time. The CDR is disclosed in U.S. patent application Ser. No. 07/424,456 filed Oct. 20, 1989 for Method and System for Detecting and Recovering from Switching Errors and assigned to the assignee of the present invention. A check is made at 602 to see if a CDR is returned for the device. If yes, the general node element qualifier is located in the CDR at 603, and the time out value for the device is extracted from the general node element qualifier at 604. At 605, the time out value extracted in 604 is returned to the caller, and the process is ended at 607. If no CDR is returned for the device at 602, a default time out value of 15 seconds is returned to the caller at 606, and the process is ended at 607.

Figure 10:
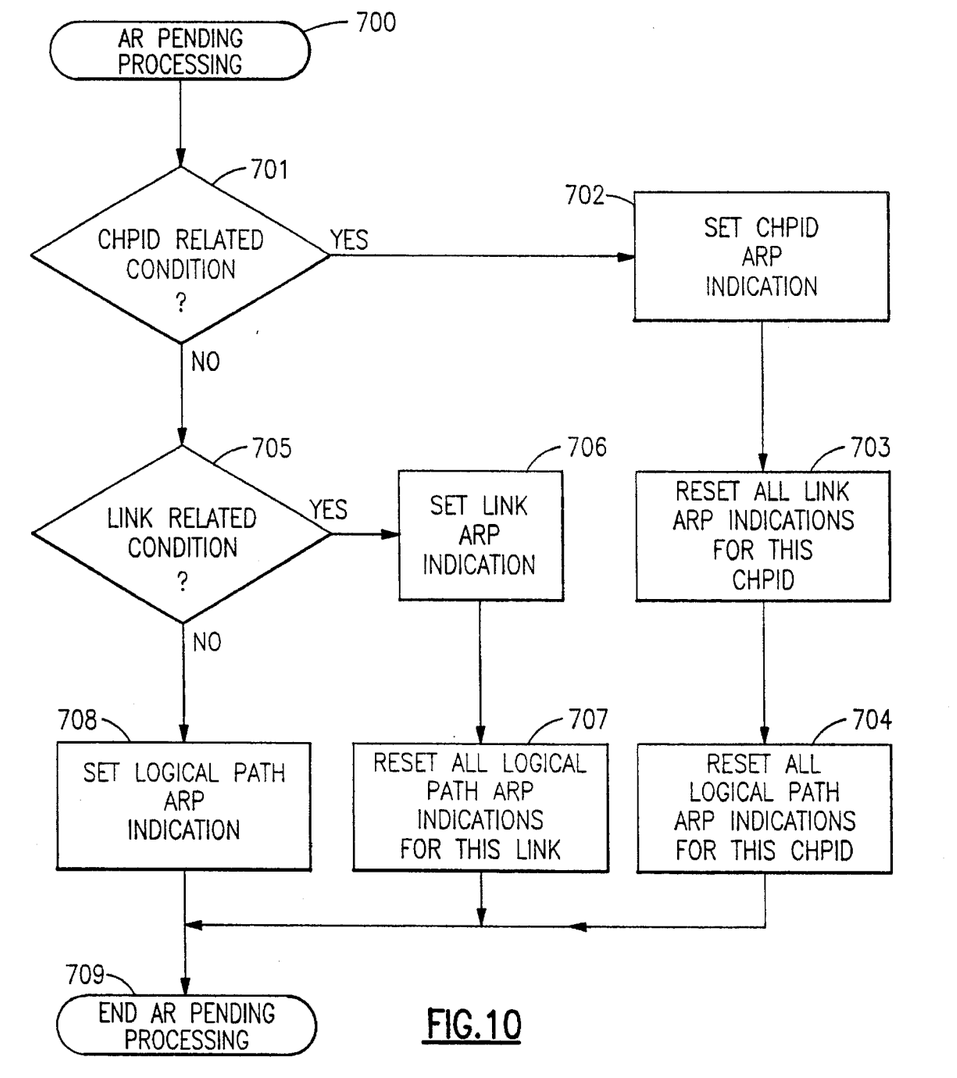
FIG. 10 is a flowchart showing the processing performed by the CSS to establish a pending Accessibility report.

FIG. 10 is a flowchart showing the processing by the hardware of the CSS for making an Accessibility report pending. The process starts at 700, and at 701 a check is made to determine if the event reported is a CHPID related condition such as a link failure or a link offline condition. If yes, the CHPID Accessibility Report Pending (ARP) is set at 702, all of the ARP indications for all links defined on the CHPID are reset at 703, the ARP indications for all logical paths defined on this CHPID are reset at 704, and the process ends at 709.

If no at 701, a check is made at 705 to determine if the event is a link related condition such as a link or port reject. If yes, the ARP indication for this link is set at 706, all logical path indications for this link are reset at 707, and the process ends at 709.

If no at 705, the ARP indication for the logical path is set at 708, and the process ends at 709.

Figure 11:
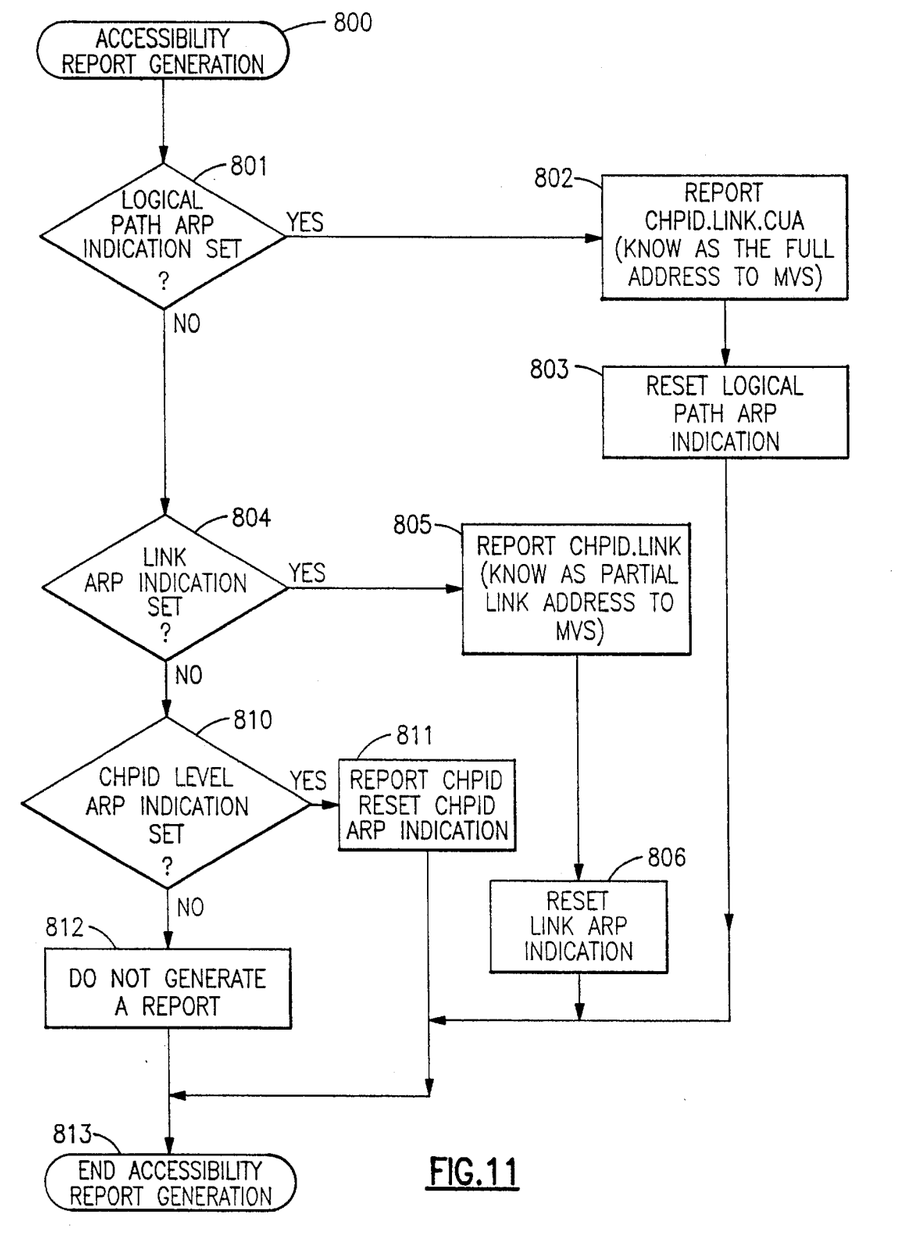
FIG. 11 is a flowchart showing the processing of the CSS to report a successful establish-logical-path procedure in the CSS.

FIG. 11 is a flowchart showing the processing of the CSS hardware for a generation of an accessibility report. This establish-logical-path procedure as disclosed in the aforementioned Logical Channel Paths in a Computer I/O System patent application for establishing a logical path in the CSS hardware. The process of FIG. 11 starts at 800. A check is made at 801 to determine if the ARP indication is set for the logical path. If yes, a full link address (FLA) is constructed at 802 including the CHPID, link address and logical control unit address, and the report issued. At 803, the ARP indication for the logical path is reset, and the processing ends at 813.

If the check at 801 is no, a check is made at 804 to determine if the ARP indication is set for the link address associated with the logical path that was successfully established. If yes, a partial link address is constructed at 805 including the CHPID and link address, and the report is issued. At 806 the ARP indication for the link associated with the logical path is reset, and the processing ends at 813.

If the check at 804 is no, a check is made at 810 to determine if the ARP indication is set for the CHPID. If yes, the ARP indication is reset at 811, the CHPID address is reported, and the processing ends at 813.

If the check at 810 is no, no report is generated, as shown at 812, and the processing ends at 813.

FIG. 10 is the processing performed by the CSS when a condition occurs which results in the removal of a resource. The condition may be related to an error or may have been induced by operational procedures. FIG. 11 is the report of the resolution of that condition which drives the establishing and restoring of the resource as described in connection with FIG. 7.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a data processing system including an I/O system having a channel subsystem connectable through a plurality of reconfigurable channel paths through a dynamic switch to at least one control unit, each control unit controlling at least one device connected to that control unit for communication with the channel subsystem and said data processing system also including memory means for storing software and data including data about channel path availability between the subsystem and the control unit for use by said software, apparatus for communicating changes in channel path availability from the channel subsystem to the memory means comprising:

a) accessibility determining means in said channel subsystem for reporting, to said memory means, accessibility, through said dynamic switch, of a channel path in said plurality of channel paths between said channel subsystem and a control unit, said accessibility determining means including:
     i) report generating means for generating a report defining said channel path and logical channel paths therein determined to be accessible by said accessibility determining means, and
     ii) pending means for sending a signal indicating a report generated by said report generating means is pending;
  b) device connected determining means including report fetching means for fetching said report generated by said report generating means in response to the signal from said pending means; and
  c) varying means responsive to said report fetched by said report fetching means for changing data stored in said memory means about said channel path, thereby making data concerning devices connected to said channel path determined to be accessible by said accessibility determining means available to said software of said data processing system.

2. The data processing I/O system of claim 1 wherein said channel path is identified by a channel path identification (CHPID), said channel path having more than one control units connected thereto.

3. The data processing I/O system of claim 1 wherein said channel path includes multiple logical channel paths, each of said logical channel paths having at least one device connected thereto.

4. The data processing I/O system of claim 3 wherein said varying means includes means for varying said data stored in memory about all logical channel paths in said channel path, thereby making all devices connected to said multiple logical channel paths in said channel path available to said I/O system without polling of said devices.

5. The data processing I/O system of claim 1 further comprising:

device responsive means responsive to all devices in said data processing I/O system for determining when any one of said devices is inaccessible to said data processing I/O system;

boxing means in said device connected determining means for boxing said any one device determined by said device responsive means to be inaccessible to said data processing I/O means; and delaying means in said boxing means for delaying said boxing means for a selective time period thereby giving said accessibility determining means time to determine that the logical channel path to which said any one device is connected has become accessible.

6. The data processing I/0 system of claim 5 wherein said delaying means includes time storage means for storing individual time delays for each device in said data processing I/O system, and said delaying means includes delay time fetching means for fetching from said time storage means the individual time delay to be used by said delaying means for said any one device determined by said device responsive means to be inaccessible to said data processing I/O means.

7. In a data processing system including an operating system and an I/O system having a channel subsystem which communicates occurrence of event information to said operating system through use of a channel report word (CRW) and the software responds to said CRW by issuing a channel subsystem call (CHSC) instruction, said channel subsystem being connectable through a plurality of reconfigurable channel paths through a dynamic switch to at least one control unit, each control unit controlling at least one device connected to that control unit, for communication with the channel subsystem, said data processing system also including memory means for storing software instructions and data, including data about channel path availability between the subsystem and the control unit, for use by said operating system, apparatus for changing said data about channel path availability comprising:

a) accessibility determining means in said channel subsystem for reporting, to said memory, accessibility through said dynamic switch of a channel path in said plurality of reconfigurable channel paths between said channel subsystem and a control unit, said accessibility determining means including:

i) report generating means for generating, in response to an event indicating said channel path's availability, a report defining said channel path and logical channel paths therein determined to be accessible by said accessibility determining means, and ii) pending means for sending a signal indicating said report generated by said report generating means is pending;

b) device connected determining means in said data processing system responsive to such signal from said pending means, said device connected determining means including report fetching means for fetching said report generated by said report generating means in response to the signal from said pending means; and c) varying means in said data processing system responsive to said report fetched by said report fetching means for changing data stored in memory about said channel path, thereby making data about devices connected to said logical channel paths determined to be accessible by said accessibility determining means available to the operating system of said data processing system.

8. In a data processing system including an I/O system having a channel subsystem, connectable through a plurality of reconfigurable channel paths through a dynamic switch, to at least one control unit each control unit controlling at least one device connected to that control unit for communication With the channel subsystem, and also having memory means for storing software instructions and data including data about channel path availability, to be accessed by said software, a method for reporting changes in channel path availability from the channel subsystem to the memory means comprising the steps of:

a) determining in the channel subsystem the accessibility through said dynamic switch of a channel path in said plurality of channel paths between said channel subsystem and a control unit;

b) generating a report defining said channel path and logical channel paths therein determined to be accessible;

c) sending a signal indicating said report generated in step b) is pending;

d) fetching said report generated in response to said signal; and e) varying said data stored in memory about the availability of said channel path and logical channel paths based on said report, thereby making said device connected to said channel path determined to be accessible, available for use by said software through said channel path.

9. The method of claim 8 further comprising the steps of:

f) determining when said device is inaccessible to the rest of said data processing system through any channel path;

g) waiting for a selected time period for giving said device determined to be inaccessible in step f) time to once again to become accessible through said channel path by the changing of said data stored in memory by step e); and h) boxing said device determined to be inaccessible in step f) and not becoming accessible during step g) as a result of the operations of step e), thereby making said any one device unavailable to said I/O system.

10. The method of claim 8 further comprising:

f) determining when said device is inaccessible;

g) periodically checking to see if said device determined to be unaccessible in step f) has become accessible by the varying of said data stored in memory by step e);

h) ending the periodic checking of step g) after a predetermined period of time has passed; and i) Boxing said device after ending of the periodic checking in step h) thereby making said device unavailable to said I/O system.

11. The method of claim 10 further comprising:

j) storing different values for the predetermined period of time of step h) for different types of devices;

k) selecting an appropriate value for such any one of said devices being checked by step g); and providing a default value for the predetermined period in absence of such an appropriate stored value.

12. In a data processing system including an operating system and an I/O system having a channel subsystem which communicates occurrence of event information to said operating system through use of a channel report word (CRW) and said operating system responds to said CRW by issuing a channel subsystem call (CHSC) instruction, said subsystem being connectable through a plurality of reconfigurable, serial channel paths through a dynamic switch to at least one control unit, each channel path identified by a channel path ID (CHPID), each control unit controlling at least one device connected to that control unit for communication with the channel subsystem, said data processing system also having main memory means for storing software instructions and data, including data about channel path availability for a device stored in a unit control block (UCB) representing said device in software, a method for changing said data about channel path availability comprising the steps of:

a) determining in the channel subsystem the accessibility of a channel path in said I/O system between said channel subsystem and a control unit;

b) generating a report in the channel subsystem specifying a CHPID defining said channel path and logical channel paths therein determined to be accessible;

c) sending a CRW to said operating system indicating said report generated in step b) is pending;

d) fetching said report in response to said signal by said operating system issuing a CHSC instruction;

e) checking the UCB defining said device in said software to determine if a logical channel path identified by said report is connected to that device; and f) varying said data stored in said UCB about said channel path based on said report, thereby making information about the accessibility of said device connected to said logical channel path available for use by said software.

13. The method of claim 12 further comprising the steps of:

g) determining when said device is inaccessible to said channel subsystem through any channel path;

h) waiting for a selected time period for giving said device determined to be inaccessible in step g) time to once again to become accessible by the varying of said data stored in memory by step f); and i) boxing said device determined to be inaccessible to said data processing I/O means in step g) and not becoming accessible during step f) as a result of the operations of steps a) to e), thereby making said device unavailable to said I/O system.

14. The method of claim 12 further comprising:

g) determining when said device is inaccessible to said channel subsystem through any channel path;

h) periodically checking to see if said device determined to be unaccessible in step g) has become accessible by the varying of said data stored in memory by steps a) to e);

i) ending the periodic checking of step h) after a predetermined period of time has passed; and j) boxing said device after ending of the periodic checking in step i) thereby making said device unavailable to said I/O system.

15. The method of claim 13 further comprising:

k) storing different values for the predetermined period of time of step i) for different types of devices including said device;

l) selecting an appropriate value for said device being checked by step h); and m) providing a default value of a predetermined period for said device in absence of such an appropriate stored value.

16. In a data processing I/O system of claim 1, further comprising subsystem connected to a control unit controlling at least one device, apparatus comprising:

device responsive means responsive to all devices in said data processing I/O system for determining when any one of said devices is inaccessible to said data processing I/O system;

boxing means in said device connected determining means for boxing said any one device determined by said device responsive means to be inaccessible to said data processing I/O system; and delaying means in said boxing means for delaying said boxing means for a selected time period thereby giving said any one device time to again become accessible to said data processing I/O system.

17. The data processing I/O system of claim 16 wherein said delaying means includes time storage means for storing individual time delays for each device in said data processing I/O system, and said delaying means includes delay time fetching means for fetching from said time storage means the individual time delay to be used by said delaying means for said any one device determined by said device responsive means to no longer be accessible to said data processing I/O means.

* * * * *